April 21, 1953 — T. G. JONES — 2,636,055
DICYCLOPENTADIENE RECOVERY PROCESS
Filed Oct. 18, 1950
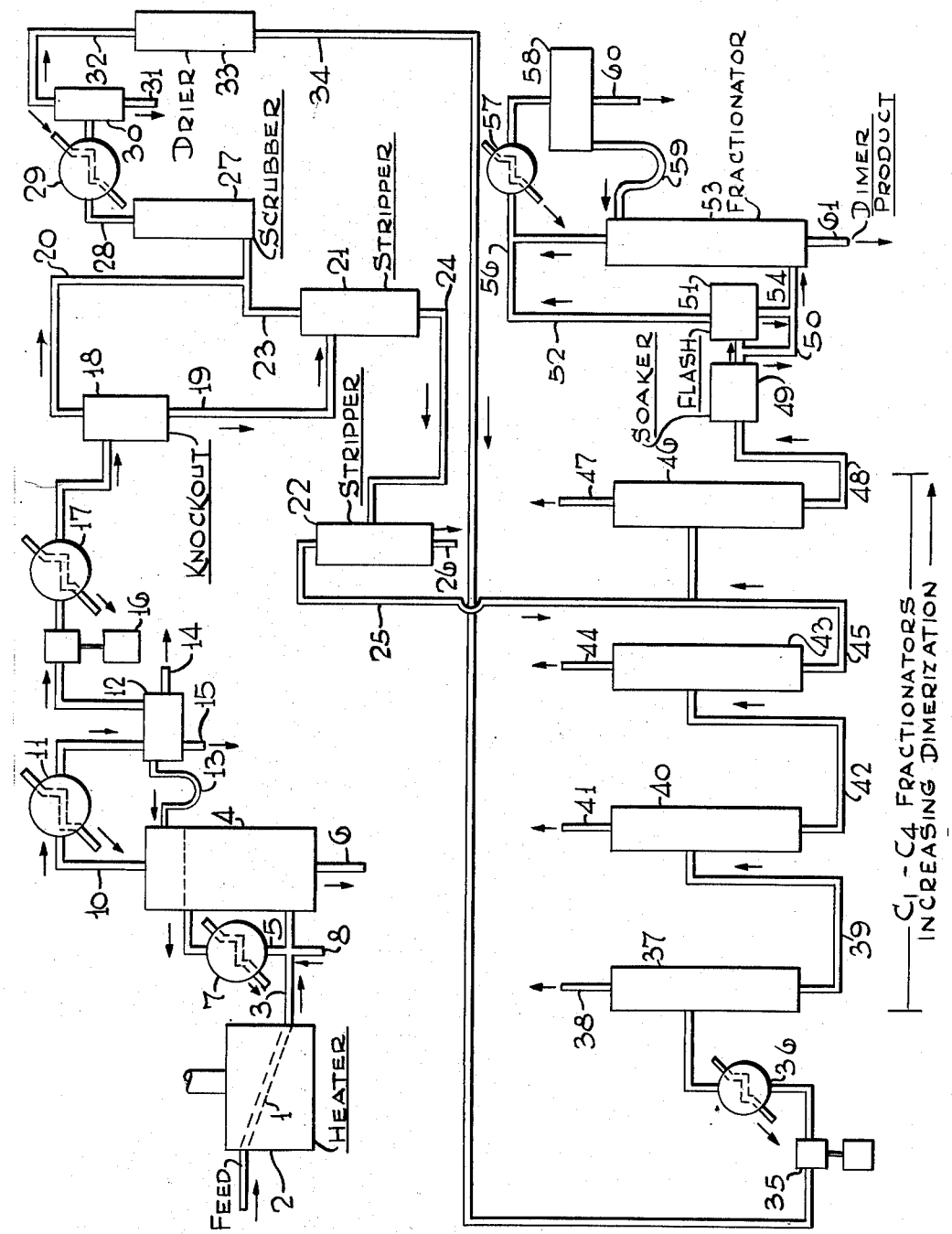
Thomas G. Jones  Inventor
By Henry Berk  Attorney Patented Apr. 21, 1953

2,636,055

UNITED STATES PATENT OFFICE 2,636,055

DICYCLOPENTADIENE RECOVERY PROCESS

Thomas G. Jones, Baton Rouge, La., assignor to Standard Oil Development Company, a corporation of Delaware Application October 18, 1950, Serial No. 190,747

8 Claims. (Cl. 260—666)

This invention relates particularly to process steps that are useful in treating high-temperature vapor-phase cracked naphtha products to obtain a vapor stream containing the cyclopentadiene product as a monomer and for subsequently separating the cyclopentadiene as a dimer from such a monomer stream.

The separation and recovery of cyclopentadiene from cracked petroleum products has presented a number of problems, because the cyclopentadiene in such products tends to be present both as monomer and polymer mixed with various hydrocarbons which tend to polymerize, copolymerize with cyclopentadiene and boil close to the boiling point of monomeric and dimeric cyclopentadiene. Another difficulty in these operations is due to the tendency of cyclopentadiene monomer to undergo dimerization or polymerization and of the dimer to undergo depolymerization at moderately elevated temperatures. Some methods were previously devised for collecting and segregating the cyclopentadiene existing as dimer in an aromatic naphtha fraction, but such methods were found to incur losses of cyclopentadiene as monomer during the segregation of the dimer, and to require extra costly steps of recovering cyclopentadiene monomer from the thus concentrated dimer.

The process of the present invention, in contrast to methods of concentrating the dimer in a naphtha fraction, first principally maintains nearly all the cyclopentadiene as a monomer in a vapor portion of the cracking zone effluent stream, the monomer vapors in the vapor stream are then separated from substantially higher boiling hydrocarbons, eliminated as liquid condensates, without substantial dimerization of the cyclopentadiene, and then are freed of lower boiling hydrocarbons to form a concentrate of the cyclopentadiene as a dimer mixed substantially with lower boiling hydrocarbons which can be easily distilled from the dimer.

The process which will be outlined comprises three main stages:

(1) A separation of the cracked hydrocarbon vapor stream containing the cyclopentadiene as monomer, advantageously under such conditions that approximately all the cyclopentadiene is removed from the higher boiling cracked products as monomer vapor and is rapidly removed in a diluted stream of the vapors to a second stage in which the monomer is further maintained in a vapor phase;

(2) In the second stage, the vapor stream containing the monomer is quickly reduced in temperature to condense out and separate higher hydrocarbons such as $C_6+$ and particularly $C_{10}$ hydrocarbons. At this point moisture present is also removed so that the remaining hydrocarbon vapor stream can be subjected to sufficiently low temperatures for separating out low boiling $C_1$ to $C_4$ hydrocarbons therefrom, the rest of the $C_5+$ hydrocarbons becoming liquefied and containing the cyclopentadiene, both as monomer and dimer; and next (3) The thus obtained $C_5+$ hydrocarbon fraction can be subjected to controlled temperatures and pressures for polymerizing the cyclopentadiene monomer to dimer and then to a controlled distillation for distilling out such $C_5+$ hydrocarbons lower boiling than the dimer to yield a highly concentrated cyclopentadiene dimer residual product of suitable high purity.

In the steps outlined, it is to be understood that methyl cyclopentadiene undergoes substantially the same treatment with the cyclopentadiene so that the final residual cyclopentadiene dimer product will tend to contain methyl cyclopentadiene dimer and its codimer with the cyclopentadiene, depending on the sharpness of separation in the second stage. A further separation may be made, if desired, in fractionally distilling the cyclopentadiene dimer from the concentrated dimers under reduced pressure.

The process will be described in more detail with reference to a simplified flow diagram shown in the accompanying drawing.

As illustrated in the drawing a charging stock of vaporized gas oil, kerosene or naphtha hydrocarbons is passed through a high temperature cracking coil 1 in heater 2 and is discharged from the cracking coil 1 through the transfer line 3 into an intermediate or lower part of a fractionating tower 4. The hydrocarbon charging stock, such as boils in the range of 250° F.–700° F. is passed through the heating coil 1 to be heated to cracking temperatures in the range of 1000° F. to 1600° F., sufficient steam being mixed with the hydrocarbon feed to give a total of about 50–90 mole percent steam base on the feed in the cracking zone, and a total pressure of from about 1 to 10 atm. is maintained in the heating tube or cracking coil.

The cracked product effluent stream is discharged from the furnace heating coil 1 into the transfer line 3 at temperatures in the range of 1000° F.–1500° F. under a relatively low pressure of the order of 0 to 100 p. s. i. g.; and, after quenching, e. g. with recirculated gas oil introduced from line 5, is discharged into the low pressure primary fractionator 4 to be separated into an overhead gas-vapor stream, a cycle gas oil condensate which collects on an intermediate plate and a bottom tar stream which is withdrawn through line 6. The cycle gas oil may be withdrawn through a cooler 7 to be used as the quench liquid injected though line 5. In addition, water may be introduced through a quench line 8, since it is desirable to quickly quench the cracked product effluent stream from the cracking coil 1 to temperatures of the order of 550° F.–350° F. or lower, as this stream is discharged into the primary fractionator 4.

As the liquid portion of the quenched products descends to the bottom of the fractionator 4 this liquid is maintained at temperatures in the range of 350° F.–650° F. and the overhead vapors withdrawn from the top part of fractionator 4 by line 10 are at temperatures of the order of 300° F.–350° F. under a pressure of about 0 to 10 p. s. i. g. In this manner a separation of normally gaseous and volatile $C_1$ to about $C_{15}$ hydrocarbons with hydrogen and a large proportion of steam is obtained at a rapid rate. Under these conditions, approximately all the cyclopentadiene present is carried along as monomers in this overhead gas-vapor stream.

The overhead gas-vapor stream is passed from line 10 through a cooling condenser 11, where it is lowered rapidly in temperature to about 90° F.–135° F. in order to condense out heavy ends, mainly $C_{10}+$ hydrocarbons, together with a large part of the steam, and the resulting condensates are collected as liquid phases in receiver 12. A portion of the hydrocarbon liquid condensate may be refluxed by line 13 to the upper part of fractionator 4 for controlling temperatures and a remainder of the condensates are withdrawn through lines 14 and 15. The remaining gas-vapor stream still diluted with some water vapor is next passed through a series of a compressor 16, cooler 17, and a knock-out drum 18, or more than one such series which are used to quickly compress and cool the gas and vapors to temperatures in the range of 90° F.–135° F. under pressures of 40–210 p. s. i. g. so that approximately all the water vapor is condensed out with most of the $C_6+$ hydrocarbons without giving the cyclopentadiene and any methyl cyclopentadiene monomers in the vapor stream an opportunity to undergo substantial dimerization or polymerization. The number of series of compressors, coolers and knock-out drums depends upon their capacities and the desired sharpness of separation. For simplification, the gas-vapor stream is herein indicated to be passed through a single series. The knock-out liquid is withdrawn from drum 18 by line 19, and the remaining gas-vapor stream is withdrawn from drum 18 by line 20. Here the vapor stream containing principally $C_1$ to $C_5$ hydrocarbons and hydrogen is ready for further processing.

In obtaining the cyclopentadiene monomer vapor stream by liquefaction of the higher boiling hydrocarbons, especially $C_{10}$ and higher, it is to be noted that the liquefaction is advantageously carried out more rapidly by compressing the gas-vapor mixture and cooling this mixture to temperatures below 135° F. in order to minimize dimerization. But, in thus liquefying the higher hydrocarbons, there is not a sharp fractionation, and substantial liquefaction of $C_6$ to $C_9$ hydrocarbons will tend to occur, even some liquefaction of $C_3$ or $C_4$ to $C_6$ hydrocarbons will occur, if it is desired to take $C_6$ hydrocarbons out of this vapor stream in this manner. Hence, in making the more exact separations of the higher hydrocarbons by compression and cooling, the liquefied portions dropped out and removed from the knock-out drum 18, or such drums, will tend to contain increased amounts of liquefied methyl cyclopentadiene and cyclopentadiene with liquefied $C_6$ and $C_5$ components. Accordingly, while separating out all or nearly all the methyl cyclopentadiene, so that higher purity cyclopentadiene dimer (above 90% purity) can be recovered from the monomer left in the gas-vapor stream, up to about ⅓ of the cyclopentadiene may tend to be liquefied at this stage. Therefore, if so desired, additional monomers of cyclopentadiene and methyl cyclopentadiene are recoverable from the knock-out drum liquids by passing these liquids through line 19 to one or more stripping zones, 21 and 22, the feed liquids being introduced at or near the top of the first zone 21, constructed like a fractional distillation column.

In the distillation recovery of the $C_5$ and $C_6$ monomers from the liquids there tends to be a substantial amount of dimerization and polymerization and the resulting dimers and polymers stay with the liquid residue. However, if it is desired to obtain increased yields of the dimer products, even with some lowering of purity, vapors taken from these stripping zones can be processed. For example, $C_3$ to $C_5$ hydrocarbon vapors at 140° F. to 160° F. from a first stripping zone 21 under a pressure of 160–180 p. s. i. g. can be added through line 23 to line 20 by which the gas-vapor stream leaves the knock-out drum 18 or be separately treated like this gas-vapor stream. If liquid bottoms from first stripping zone 21 is passed by line 24 into a second stripping zone 22, the $C_4$–$C_6$ hydrocarbon vapors from zone 22 at 160° F.–170° F. under a pressure of about 100 p. s. i. g. can be passed by line 25 to join a $C_4+$ stream entering a debutanizer as will be later explained. The stripped liquids withdrawn by line 26 comprises $C_6+$ hydrocarbons.

Again proceeding with the processing of the gas-vapor product stream that leaves the knock-out drum 18 by line 20, and then is to be treated for removal of hydrogen and the $C_1$ to $C_4$ hydrocarbons, this stream should be substantially free of moisture and preferably free of $H_2S$. The $H_2S$ is removed by treatment of the gas-vapor stream in zone 27, e. g., by scrubbing with a caustic solution under a pressure of 140 to 210 p. s. i. g. and at 140° F. to 180° F. The scrubbed vapors are passed through line 28 and may be further cooled in cooler 29 as they leave the scrubber 27; then they are passed into a knock-out drum 30 for dropping out an entrained liquid condensate, withdrawn by line 31. Thence, the gas-vapor stream is passed by line 32 into a drier or dehydrator 33 for contact with a drying agent such as active alumina, calcium chloride, or the like, for ensuring substantially complete removal of moisture before the monomer-bearing gas-vapor is next led through line 34 to the third stage treatment for separating hydrogen and the $C_1$ through $C_4$ hydrocarbons.

The moisture-free gas-vapor stream is compressed by compressor 35 and chilled in cooler 36 to liquefy $C_2$ to $C_5$ hydrocarbons in order to separate out the gaseous hydrogen and lower hydrocarbons by fractional distillation; but beginning at this point no difficulty is encountered if the cyclopentadiene starts to dimerize in the resulting liquid, especially if most of the fractionation is carried out at suitably low temperatures. Thus, it is desirable to flash vaporize the $C_1$–$C_4$ fractions in a series of distillation zones of consecutively diminished pressure. It is also desirable to distill such fractions separately and obtain a practically complete removal of the $C_4$ hydrocarbons from the liquids, as will be described next with reference to the drawing.

The substantially dry gas-vapor stream is compressed in compressor 35 and cooled in cooler 36 sufficiently to liquefy the $C_2+$ hydrocarbons, using, e. g., liquid propylene or liquid $NH_3$ as the refrigerant in the cooler 36, then is flashed into a fractionating zone 37 operated at temperatures of between −30° F. and 125° F. and under pressures of about 550–570 p. s. i. g. in order to distill off a $C_1$–$C_2$ fraction containing large proportions of methane, ethane, hydrogen and ethylene which are removed through overhead line 38. The residual liquid is withdrawn from the bottom of fractionator 37 by line 39 and flashed into a somewhat lower pressure column 40, in which under a pressure of about 450 to 500 p. s. i. g. a concentrated gaseous ethylene stream containing ethane with ethylene is removed at about 25° F. to 30° F. through line 41. The remaining liquid at about 175° F. to 195° F. from this second fractionator is flashed from line 42 into a third fractionator 43, wherein under a pressure of about 280–320 p. s. i. g. a gaseous concentrated $C_3$ stream is distilled overhead at about 110° F. to 125° F. through line 44. The residual liquid at about 235° F.–250° F. from fractionator 43 is passed by line 45 into a fourth fractionating tower 46 wherein under a pressure of about 80–90 p. s. i. g. the $C_4$ hydrocarbons at about 130° F.–140° F. are taken overhead through line 47, leaving a residual liquid of mainly $C_5$ and higher hydrocarbons which are withdrawn at a temperature of about 230° F–240° F. through line 48. This final liquid fraction is substantially free of such hydrocarbons as isobutylene and butadiene as well as other $C_1$–$C_4$ hydrocarbons; and with the elimination of such hydrocarbons at relatively low temperatures very little opportunity was given for reaction of cyclopentadiene with the copolymerizable butadiene and isobutylene. This $C_5+$ liquid, thus obtained, is characterized by having, in general, a large proportion of $C_5$ mono-olefins, and relatively smaller amounts of isoprene, cyclopentadiene, piperylenes, etc. as indicated in the following typical analysis:

TABLE

*Analytical data on $C_5+$ fraction*

Components:

| | |
|---|---|
| $C_4$ Hydrocarbons_____wt. per cent__ | 1.0 |
| Cyclopentadiene monomer_____do____ | 6.2 |
| Isoprene _____do____ | 10.0 |
| Piperylenes _____do____ | 15.0 |
| $C_5$ saturates_____do____ | 2.0 |
| $C_5$ mono-olefins (predominantly type I) _____wt. per cent__ | 47.0 |
| Me cyclopentadiene monomer__do____ | 0.8 |
| Benzene _____do____ | 3.0 |
| Other $C_6$ to $C_9$ of cyclopentadiene _____wt. per cent__ | 7.0 |
| Dimer of cyclopentadiene____do____ | 5.3 |
| Dimer of methyl cyclopentadiene _____wt. per cent__ | 0.7 |
| Other $C_{10}+$ _____do____ | 0.6 |
| Sp. Gr. 60/60_____ | 0.7157 |
| A. S. T. M. Dist. I. B. P_____ | 96. |

It appears to be significant that while some of the cyclopentadiene and methyl cyclopentadiene undergoes dimerization during the last described fractionation steps, there is very little loss during these steps on account of the efficient removal of the $C_1$–$C_4$ hydrocarbons at low temperatures used in these separation steps. At this point the dilution of the reactive diolefins by the $C_5$ mono-olefins (predominantly type I) has also substantially aided in preventing undesired side reactions, such as interpolymerization of cyclopentadiene or of methyl cyclopentadiene. This $C_5+$ fraction, which is largely $C_5$, is satisfactorily freed of other hydrocarbons that would boil close to or above the boiling points of the dimers of the cyclopentadiene and methyl cyclopentadiene present in this fraction. This $C_5+$ fraction may be passed into a dimerization tank 49 to be maintained therein under moderate dimerization conditions of about 150° F.–250° F. for approximately 24 to 2 hours, preferably for 4 to 12 hours at 200° F.–212° F. in order to complete dimerization of over 90% of the cyclopentadiene and methyl cyclopentadiene. From tank 49 the liquid stream containing the dimers is discharged by line 50 directly into a fractionator 53 for distilling off the hydrocarbons lower boiling than the dimers. Alternatively, it is advantageous to pass all or a portion of the liquid material from the dimerization vessel 49 into an intermediate flash vessel 51 in which the liquid material is heated at a temperature of 150° F.–180° F. under a pressure of 50–30 p. s. i. g. so that from about 30 to 50 volume per cent of the material is flashed overhead and can be withdrawn by lines 52 by-passing the fractionator 53, thus, not only greatly reducing the load on the fractionator 53, but further reducing chances for the dimer to further polymerize and reducing chances of interpolymerization. In using the intermediate flash vessel 51 the remaining liquids that are not vaporized are passed by lines 54 and 50 into the fractionator 53.

By operating the fractionator 53 so that it has a bottom temperature below 280° F. and a top temperature of approximately 130° F. under atmospheric pressure or thereabout, the overhead vapor withdrawn by lines 55 and 56 cooling condenser 57 to receiver 58 consists of the lighter than dimer components plus any steam or other gaseous agent introduced into the tower to aid the distillation. Part of this distillate may be refluxed by line 59 and part withdrawn by line 60 from receiver 58. The bottoms product withdrawn by line 61 from the recovery tower 53 can thus be obtained with better than 90% purity of the cyclopentadiene and methyl cyclopentadiene dimers and with a yield substantially superior to what can be obtained in processing the original cracked product stream effluent to recover only the dimers which were present in such a stream.

Analysis of the dimer product having over 90% dimer content shows a volume distillation of 90% between the temperatures 190° F. and 210° F. under 50 mm. mercury pressure absolute.

The cyclopentadiene dimer and methyl cyclopentadiene products of high purity thus obtained are valuable commercially for the manufacture of various chemicals. They are useful in forming various synthetic resins, drying oils and as intermediates for preparing valuable insecticides and other chemicals.

One of the other important advantages gained through the use of the present method of operation for separating the cyclopentadiene and methyl cyclopentadiene is that it gives a valuable method of eliminating cyclopentadiene and methyl cyclopentadiene from hydrocarbons which can be used in motor gasoline blending since these diolefinic cyclic compounds have bad gum forming action in gasolines. Still further their removal from the other $C_5$ diolefins is beneficial in the further processing of these $C_5$ diolefins to obtain, for example, an isoprene concentrate to be used in making synthetic rubber compounds.

Having described the invention, the following claims are set forth.

1. In a process for segregating cyclopentadiene from a stream of cracked hydrocarbons, the steps which comprise quenching a vapor stream of the cracked hydrocarbons under reduced pressure to lower their temperature, withdrawing from the quenched hydrocarbons a remaining vapor stream of $C_1$ to $C_{10}+$ hydrocarbons including cyclopentadiene as monomer, cooling the withdrawn vapor stream sufficiently to condense $C_{10}+$ components therein to liquids, compressing and cooling the remaining vapor stream containing $C_1$ to $C_{10}$ hydrocarbons to liquefy its $C_6+$ components, separating the remaining vapor stream of $C_1$ to $C_5$ components from the liquefied $C_6$ to $C_{10}$ components, further compressing and cooling the remaining vapor stream containing $C_1$ to $C_5$ components and which has been freed of $C_6$ to $C_{10}$ components to liquefy the components in the $C_2$ to $C_5$ range, progressively reducing pressure on the thus further compressed stream containing liquefied $C_2$ to $C_5$ components to fractionally distill $C_1$ through $C_4$ components therefrom and obtain a residual liquid fraction containing the liquefied $C_5$ components.

2. In a process as described by claim 1, maintaining the quenched cracked hydrocarbons at 300° F. to 350° F. under a reduced pressure of 0 to 10 p. s. i. g. while separating therefrom said vapor stream of $C_1$ to $C_{10}+$ hydrocarbons including cyclopentadiene as monomer, separating the vapor stream of $C_1$ to $C_{10}+$ hydrocarbons with a large amount of steam from the quenched cracked hydrocarbons, cooling the vapor stream separated from the quenched hydrocarbons to a temperature in the range of 90° F. to 135° F. to condense out the steam and $C_{10}+$ hydrocarbons before the remaining vapor stream containing $C_1$ to $C_{10}$ hydrocarbons is compressed and cooled to liquefy the $C_6$ to $C_{10}$ components.

3. The process as described in claim 1, wherein the vapor stream containing $C_1$ to $C_5$ hydrocarbon components is dried free of moisture before being further compressed and cooled to liquefy $C_2$ to $C_5$ components, and the liquefied $C_2$ to $C_5$ components are maintained at temperatures in the range of —30° F. to 140° F. in fractionally distilling off the $C_1$ to $C_4$ components to obtain the residual liquid fraction containing the liquefied $C_5$ components.

4. In a process as described by claim 1, wherein the $C_1$ through $C_4$ components are distilled off under progressively reduced pressures, progressively heating said liquefied components in the $C_2$ through $C_5$ range up through temperatures in the range of —30° F. to 140° F. to flash distill the $C_1$ to $C_4$ components from the remaining liquefied $C_5$ components, dimerizing cyclopentadiene monomers present among the $C_5$ components as the $C_2$ through $C_4$ components are flash distilled away, and thereafter dimerizing the remaining cyclopentadiene monomer in the residual liquid fraction which is substantially free of $C_4$ and lower boiling components.

5. A process for segregating cyclopentadiene from vapor phase hydrocarbons cracked in the presence of steam, which comprises quickly quenching the vapor phase cracked hydrocarbon product from the cracking temperature of the hydrocarbons to a temperature between 300° and 550° F. under a pressure of 0 to 100 p. s. i. g. to maintain from $C_1$ up through $C_{10}$ hydrocarbon components of said product in the resulting vapor phase stream of the cracked product to leave a minimum of the cyclopentadiene as dimer in the resulting quenched liquid portion of said product, separating said vapor phase stream from the quenched liquid product, quickly cooling the vapor phase stream to a temperature in the range of 90 to 135° F. to condense the steam and $C_{10}+$ components, compressing and cooling the remaining vapor phase stream of $C_1$ to $C_{10}$ hydrocarbon components to temperatures below 135° F. and a pressure of 40 to 210 p. s. i. g. to condense out therefrom $C_6+$ components, removing the thus condensed $C_6+$ components from the remaining vapor phase stream, further compressing and cooling the remaining vapor phase stream to liquefy the hydrocarbon components in the $C_2$ to $C_5$ range, progressively heating the resulting steam containing liquefied hydrocarbon components in the range of —30° F. to 140° F. and progressively reducing pressure on said stream to flash vaporize its $C_1$ to $C_4$ components and obtain a residual liquid product of the $C_5$ hydrocarbons containing cyclopentadiene both as monomer and dimer.

6. A process for recovering cyclopentadiene in the product of higher-boiling hydrocarbon oil cracked in the vapor phase at 1000° F. to 1600° F. in the presence of steam, which comprises cooling said product to between 300° F. and 550° F., fractionating from said cooled product a gas-vapor stream at about 300° F. to 350° F., cooling said gas-vapor stream to a temperature of 135° F. to 90° F. to condense out $C_{10}+$ hydrocarbons and steam therefrom, separating aqueous condensate from the remaining gas-vapor stream, compressing the remaining gas-vapor stream to pressures of about 40 to 210 p. s. i. g. and cooling the thus compressed gas-vapor stream to maintain its temperature at about 135° F. to 90° F. in condensing out $C_6$ to $C_{10}$ hydrocarbons, separating from the remaining gas-vapor stream of $C_1$ to $C_5$ hydrocarbons from the condensate of the $C_6$ to $C_{10}$ hydrocarbons, compressing the remaining gas-vapor stream of $C_1$ to $C_5$ hydrocarbons to liquefy its hydrocarbon components in the $C_2$ to $C_5$ range, progressively heating and reducing pressure on the liquefied $C_2$–$C_5$ hydrocarbons to distill $C_1$ through $C_4$ hydrocarbons therefrom and leave a residual liquid containing the liquefied $C_5$ hydrocarbons, heating said residual liquid under pressure to temperatures in the range of 150° F. to 250° F. to obtain dimerization of monomeric cyclopentadiene therein, then distilling lower-boiling hydrocarbons present from the dimerized cyclopentadiene.

7. A process for recovering cyclopentadiene from the product stream of a hydrocarbon oil cracked in vapor phase at cracking temperatures of 1000° F. to 1600° F. in the presence of steam, which comprises quenching the cracked product stream in lowering its temperature from said cracking temperatures, discharging the quenched product stream with lowering of pressure into a bottom part of a fractionating zone, fractionally distilling a gas-vapor stream containing $C_1$ to $C_{10}$ hydrocarbons at a temperature of about 300° F. to 350° F. from said fractionating zone, cooling said gas-vapor stream as it is withdrawn from said fractionating zone to a temperature of about 135° F. to 90° F. to condense out $C_{10}+$ hydrocarbons and steam, compressing the remaining gas-vapor stream to pressures in the range of 40 to 210 p. s. i. g. and cooling the thus compressed gas-vapor stream to condense out $C_6$ and higher hydrocarbons, separating said condensed out hydrocarbons from the remaining gas-vapor stream, further compressing and cooling said remaining gas-vapor stream to liquefy its $C_2$-$C_5$ hydrocarbon components, reducing pressure on and raising the temperature of the liquefied $C_2$ to $C_5$ hydrocarbons to distill $C_1$ through $C_4$ hydrocarbons therefrom so as to leave the $C_5$ hydrocarbon as residual liquid, heating said residual liquid under pressure to temperatures in the range of 150° F. to 250° F. to obtain substantially complete dimerization of monomeric cyclopentadiene therein, then distilling hydrocarbons lower boiling point than the resulting monomeric cyclopentadiene dimer therefrom.

8. A process for recovering cyclopentadiene from the product stream of hydrocarbon oil cracked in vapor phase with admixed steam, which comprises quenching the cracked product stream, discharging the quenched product stream with lowering of pressure into the bottom part of a fractionating zone, maintaining residual liquid of the cracked product stream in the bottom part of the fractionating zone at temperatures between about 550° F. and 650° F., withdrawing from the top part of the fractionating zone a gas-vapor stream at about 300° F. to 350° F., cooling said gas-vapor stream to temperatures between about 135° F. and 90° F. in order to condense out water and $C_{10}+$ hydrocarbons, separating the remaining gas-vapor stream of $C_1$ to $C_{10}$ hydrocarbons from the thus formed condensate, compressing the remaining gas-vapor stream freed of water and $C_{10}+$ hydrocarbons to pressures of about 40–210 p. s. i. g. in order to condense out $C_6$ and higher hydrocarbon components, compressing the remaining gaseous portion of the gas-vapor stream containing $C_1$ to $C_5$ hydrocarbons and substantially free of water under sufficient atmospheric pressure and low temperatures to liquefy its $C_2$ to $C_5$ hydrocarbon components, maintaining the thus liquefied $C_5$ hydrocarbons under pressure and at temperatures below 140° F. while separating up through $C_4$ hydrocarbon components therefrom, heating the remaining liquefied $C_5$ hydrocarbons including principally mono-olefins and diolefins to temperatures in the range of about 150° F. to 250° F. to obtain dimerization of monomeric cyclopentadiene therein, then distilling lower boiling hydrocarbons from the resulting dimerized cyclopentadiene.

THOMAS G. JONES.

References Cited in the file of this patent

UNITED STATES PATENTS

| Number | Name | Date |
|---|---|---|
| 2,387,993 | Hepp | Oct. 3, 1945 |
| 2,439,307 | Legatski | Apr. 6, 1948 |